United States Patent [19]

Kambanis et al.

[11] Patent Number: 4,537,941

[45] Date of Patent: Aug. 27, 1985

[54] LIGNIN-MODIFIED PHENOLIC ADHESIVES FOR PRESSED WOOD PRODUCTS

[75] Inventors: Stamatis M. Kambanis, Toronto; Antoine Berchem, Rosèmere; Dennis Gregoire, Laval; Jaroslav Rybicky, Brampton, all of Canada

[73] Assignee: Reichhold Limited, Ontario, Canada

[21] Appl. No.: 644,949

[22] Filed: Aug. 28, 1984

[51] Int. Cl.$^3$ .............................. C08G 8/28; C08H 5/02
[52] U.S. Cl. ..................................... 527/403; 524/735
[58] Field of Search ........................ 527/403; 524/735

[56] References Cited

U.S. PATENT DOCUMENTS

| | | | |
|---|---|---|---|
| 2,227,219 | 12/1940 | Fiedler | 260/45 |
| 3,185,654 | 5/1965 | Ball et al. | 527/403 |
| 3,227,667 | 1/1966 | Moffitt et al. | 527/403 X |
| 3,285,801 | 11/1966 | Sarjeant | 527/403 X |
| 3,325,426 | 6/1967 | Markham | 260/17.5 |
| 3,597,375 | 8/1971 | Ludwig et al. | 527/403 X |
| 3,658,638 | 4/1972 | Ludwig et al. | 161/262 |
| 3,864,291 | 2/1975 | Enkvist | 260/17.5 |
| 3,886,101 | 5/1975 | Felicetta et al. | 260/17.5 |
| 3,931,070 | 6/1976 | Bond et al. | 260/17.5 |
| 4,303,562 | 12/1981 | Hollis, Jr., et al. | 260/17.5 |
| 4,324,747 | 4/1982 | Sudan et al. | 264/13 |

*Primary Examiner*—Earl Nielsen
*Attorney, Agent, or Firm*—Larson and Taylor

[57] ABSTRACT

An improved modified phenol-formaldehyde resin, and a process for its preparation, which contains lignosulfonates is described. Typically, the lignosulfonates are in the form of black liquor. These resins are made by including with the phenol a small amount of potassium ferricyanide. Unlike the known processes utilizing black liquors and the like, this process appears to be far less susceptible to the inherent variability of these liquors. These resins can be easily converted into a solid by spray drying, and find use as adhesives, for example in board products.

35 Claims, No Drawings

LIGNIN-MODIFIED PHENOLIC ADHESIVES FOR PRESSED WOOD PRODUCTS

This invention relates to modified phenol-formaldehyde resins, and to methods of their preparation. In particular it relates to methods of incorporating into a phenol-formaldehyde resin waste materials resulting from paper making procedures, together with an alkali ferricyanide, and to the modified resin thus obtained.

Partly as a result of cost and partly as a consequence of available supplies it has long been the practice to prepare phenol-formaldehyde resins from materials which are neither pure phenol nor pure formaldehyde. In both cases materials of a technical level of purity are commonly used. But of these two, the phenol component is by far the more expensive. As a consequence many efforts have been made to replace the phenol either completely, for instance as in urea-formaldehyde and melamine-formaldehyde resins, or at least in part with another substance and thus obtain either a different resin with new uses (as in the case with the use of urea or melamine) or a resin with approximately the same properties but which is cheaper. In this context it must be understood that "replacement" does not mean the incorporation of an inert, or relatively inert, diluent for the phenol. What is sought is a replacement substance which will take part in the chemistry of either the resin-making process or, where applicable, the resin curing process or even in both resin making and curing. These restrictions severly limit the number of possible substances that can be considered as potential replacement substances for phenol in phenol-formaldehyde resin systems.

All paper-making processes which employ a cellulosic material feed, irrespective of whether the overall process is directed toward first quality bond paper or low quality board for packaging, include as an early step a procedure whereby the cellulosic feed, such as wood, straw or bagasse is reduced to a fibrous mass. That pulp preparation step also produces as a by-product an aqueous complex mixture of organic materials. The water-insoluble part of this mixture is generally removed by a suitable procedure. The remainder of the mixture, comprising a complex solution in water (which is to be taken as including both emulsions and colloidal suspensions), is generally treated to remove at least some of the water and then discarded. Disposal of this material presents a very difficult pollution problem. Typically, the water is removed to provide an aqueous material containing about 50% to 55% of organic substances: that is, to a solids content of about 50% to 55%, by weight.

Regardless of whether the pulping process used is the sulfite process, the kraft process, or a thermo-mechanical process, even though the detailed constitution of this byproduct changes, its major component is a lignin-derived material, frequently a lignin sulfonate (also described as a lignosulfonate). It is known that lignin materials of this type are reactive toward formaldehyde, and thus various attempts have been made to use these papermill byproducts in resins as a phenol replacement. In U.S. Pat. Nos. 3,185,654 (issued May 25, 1965 to West Virginia Pulp and Paper Company); 3,227,667 (issued Jan. 4, 1966 to The Borden Company); 3,597,375 (issued Aug. 3, 1971 to Georgia-Pacific Corporation); and 3,886,101 (issued May 27, 1975 to Georgia-Pacific Corporation) are described procedures whereby the lignin-containing portion of these materials may be used in phenol-formaldehyde resin systems intended for use as adhesives, for example in the manufacture of plywood and similar products.

All of these procedures suffer from at least one of the following disadvantages. The most common is that if a useful resin is to be obtained it is necessary to purify or isolate the lignin material from the remainder of the materials in the liquor used. The second disadvantage is that chemical modification of the lignin often is required: e.g. U.S. Pat. No. 3,886,101 describes polymerizing lignin sulfonates with an aldehyde or epoxy cross-linking agent, and U.S. Pat. No. 3,658,638 describes pre-reacting a lignin sulfonate with a phenol. The third disadvantage, more common in the earlier work, is that the lignin-based material is used merely as an inert extender, and is not expected or even wanted to take part in the resin chemistry: as a consequence at least some impairment of the resin properties must result from the dilution.

None of the described techniques have been found successful, insofar as none of these known processes appear to be worked on a commercial scale. But the cost of phenol is steadily rising, and the pressure on paper and board mill operators to eliminate environmental pollution is increasing rapidly. There is therefore considerable commercial stimulus toward the replacement of phenol. Quite independently the elimination of these paper and board mill waste liquors is also very desirable, as they present a severe pollution problem and simply cannot be discarded into a local sewer or river. Processes which require the isolation or purification of the lignin-material from paper and board mill wastes are self defeating to an extent, since in isolating the lignin-material from the waste there is no decrease in the overall amount of waste that has, somehow, to be discarded. The point is that processing one kilo of black liquor from a kraft process plant to remove from it the lignin-based material present still leaves one kilo of a different liquid residue for disposal.

Many attempts have been made to overcome the inherent loss of resin properties that results when the lignin sulfonate is used as a mere diluent. Generally, two methods have been considered in order to overcome the observed loss of properties, as evidenced, for example in poor board properties when these resins are used to make waferboards. One method studied has been to incorporate the lignin sulfonate in the resin preparation procedure, often-times in conjunction with the use of special reaction techniques. Examples of this are U.S. Pat. Nos. 3,886,101 and 3,658,638 mentioned above. Whilst these techniques do permit the amount of phenol needed to be decreased, their cost effectiveness is questionable, as the cost of the added steps may even be higher than the cost saving resulting from the decrease in the amount of phenol used.

A second method studied has been to add a fourth substance to the system, to act as a catalyst, or co-catalyst if added to the resin making process, which will persuade the lignin sulphonate to enter into reaction either with the resin, or with some of the resin reactants. For example, U.S. Pat. No. 2,227,219 (issued Dec. 31, 1940 to General Electric Company) describes a resin making procedure in which ammonia or an amine are added sometime after the resin making reaction has been commenced; U.S. Pat. No. 3,886,101 proposes to pre-react a lignin sulfonate with an aldehyde or epoxide; and U.S. Pat. No. 3,931,070 (issued Jan. 6, 1976 to Georgia-Pacific) proposes to incorporate a trialkyl phosphate into the resin mixture.

These proposals again seem to be of doubtful value, since either an expensive substance is being added, or the resin making procedure is being made more complex. These disadvantages may effectively eliminate the potential cost benefit of the economy in expensive phenol usage also obtained.

Thus no simple and cost-effective technique seems to have been described whereby a lignin sulfonate may be advantageously incorporated into a phenol-formaldehyde resin. But phenol continues to increase in price, and paper and board mill operators find it increasingly difficult and expensive to dispose of spent sulfite liquor or black liquor.

A further point should be considered. In addition to providing a cheaper resin, it is also essential that there be no impairment of the properties of any products made from the resin. For example, little is gained if a cheaper resin proves incapable of providing a wafer board which meets the relevant industry standards for strength, internal bond, and so forth. Many of the proposed modified resins do not provide wafer board products with acceptable properties.

A third disadvantage common to all uses of these paper and board mill residues also is of importance. Black liquor, or spent sulfite liquor, as made in a mill is not a simple substance. It is a very complex mixture of substances, and is of variable composition. The composition generally will vary due to the inherent variability of the wood being processed. It varies significantly if there is a change in the species being pulped. The composition will also vary as a consequence of any changes in the pulping procedure made to affect the quality of the desired paper product. It is a common experience that this variability in the black liquor is also reflected in any resin glues prepared using it. To a degree this can be avoided by purifying the liquor, but then, as is pointed out above, the cost advantages to be expected from decreased phenol use can be lost in the costs associated with the resin purification steps. This variability need not be minor: a given resin which has functioned adequately when admixed with a lignin sulfonate liquor in the past may fail completely when processed in the same way with a new batch of lignin sulfonate liquor. This inability to control final resin properties in the face of uncontrollable black liquor variations is perhaps the single most significant reason for these systems being largely unused commercially.

We have now discovered a simple, elegant, and relatively inexpensive technique whereby a lignin sulfonate modified phenol-formaldehyde resin can be prepared which appears to overcome many of the observed problems. Particularly, this technique appears to be far less susceptible to the observed and uncontrollable changes in black liquor supplies. Further, these modified resins can be spray dried to provide an easily handled, stored, and transported product which nevertheless is readily dispersable in water to provide a liquid resin again. This procedure merely requires that an effective amount of potassium ferricyanide be added at the correct time in the resin making process, the other resin making components being phenol, formaldehyde, lignin sulphonate (either as recovered solids or black liquor) and a basic catalyst.

Thus in its broadest aspect this invention provides a process for the preparation of a lignin sulphonate-modified phenol-formaldehyde resin which comprises together phenol, formaldehyde, potassium ferricyanide, lignosulphonate, and an alkali or alkali earth basic catalyst in the following ratios:

(a) phenol/formaldehyde: from 1:1.8 to 1:3.0 on a molar basis;
(b) phenol/basic catalyst: from 1:0.1 to 1:0.5 on a molar basis;
(c) phenol/potassium ferricyanide: from 100:1 to 10:1 on a weight basis; and
(d) phenol/lignin sulfonate: from 1:0.1 to 1:0.5 as lignin sulphonate solids, or from 1:0.2 to 1:1.0 as black liquor, on a weight ratio basis, provided that irrespective of the sequence in which the reactants are mixed, the potassium ferricyanide is added either with or before the phenol, the reaction being continued until the desired viscosity is reached.

Preferably the phenol/formaldehyde ratio is 1:2.2 on a molar basis.

Preferably the phenol/catalyst ratio is 1:0.25 on a molar basis; the catalyst of choice is sodium hydroxide.

Preferably the phenol/lignin sulfonate solids ratio is in the range of from about 1:0.35 to about 1:0.45 by weight, which is equivalent to a phenol/black liquor ratio of 1:0.67 to 1:0.83 by weight approximately.

Preferably the phenol/potassium ferricyanide ratio is from 50:1 to 25:1 on a weight basis.

It is noted above that the catalyst of choice is sodium hydroxide. The other alkali and alkali earth bases can also be used, for example potassium, calcium and barium hydroxides. Another commonly used basic catalyst for preparing resole resins is ammonia, or ammonium hydroxide. In this process ammonia, and ammonium hydroxide, should be avoided. It appears that the stability of aqueous lignin sulfonate systems is pH dependent, especially in the case of black liquor. The minimum pH value for stability appears to be at around pH 9; the use of ammonia or ammonium hydroxide can result in lower pH values than this in the resin reaction mass. At pH values below about 9, destabilization of the black liquor can occur and cause significant problems in the resin making process.

The term "phenol" can include not only pure and technical grade phenol, but also cresols with a high meta- or para-cresol content. The preferred phenol composition is one with a boiling range of 180°–200° C., and containing not more than 15% by weight or ortho-cresol plus xylenols.

The formaldehyde can be used in any of the commercially available forms containing from 37% to 100% formaldehyde, such as aqueous solutions, paraformaldehyde, etc. An aqueous formaldehyde solution is preferred. It is also to be noted that in view of the comments above concerning the use of ammonia or ammonium hydroxide as the catalyst, the use of hexamethylene tetramine as a formaldehyde source should be avoided.

The lignin sulfonate material used in this process can be in any convenient form. The most convenient and the cheapest is to use it straight from a paper or board mill, particularly kraft black liquor. Modified lignosulfonates can also be used as can also lignin sulfonate compositions obtained by concentrating black liquors to remove the water therein, including dry lignin sulfonate solids obtained by this route. The only property of the material which needs to be established is its solids content in order to ensure that a proper phenol/lignin sulfonate solids weight ratio is obtained. It also appears that the source of the lignin sulfonate material is not very important. Unlike other earlier described processes, this invention appears to be relatively insensitive to changes in the liquor used.

The resin preparation reaction is carried out under essentially conventional conditions. Due to the presence of the lignin sulfonate, some modifications in this conventional process are possible. It is not necessary to add all of the lignin sulfonate at the beginning; up to half can be added initially and the remainder as the reaction goes along. Alternatively, all of the lignin sulfonate can be allowed to pre-react with the formaldehyde, before addition of the remaining reactants. However, there is one essential requirement that must be observed if a satisfactory resin is to be obtained. The potassium ferricyanide must be present when the phenol is added. Thus the potassium ferricyanide preferably is added immediately before, or with, the phenol. Why this should be necessary is not clearly understood. There is some indication that the potassium ferricyanide modifies, in some way, the lignin sulfonate-phenol interaction.

The resin reaction system can also contain the conventional additives, such as foam suppressants. The amount of water used is also a matter of convenience. Where a liquid resin is prepared, it can be diluted with water to a desired solids content. Where a solid resin is required, this can be obtained by the usual concentration and water removal techniques to provide a solid, as flakes, lumps, or powder. These resins are also suitable for spray drying to obtain a free flowing powder, and this is the preferred method for obtaining a dry powder resin.

The resin reaction conditions used are generally conventional, the time and temperature profiles and manner of catalyst addition being selected to fit the type of resin desired. As is conventional, a viscosity measurement generally is used to determine when the reaction has reached the desired level of polymerization. Consequently many of the useful features of resin preparation procedures which are known to affect final resin properties can be used here. In the following examples a number of variations are given for resin preparation both as regards reactant ratios, addition sequences and temperature profiles. In these examples the letter viscosities given are Gardner-Holt. Percentages, unless otherwise identified, are by weight. The various board properties mentioned were all measured by standard testing techniques.

EXAMPLE 1

1000 g kraft black liquor (50% solids, pH 13) was mixed with 768 g phenol, 1079 g formaldehyde solution (50%), 3 g antifoam agent, 15 g potassium ferricyanide, and 990 g water. Temperature was adjusted to 45° C. and 95 g sodium hydroxide solution (50%) was added. The mixture was kept at 65° C. for 75 minutes and then at 80° C. until viscosity C-D was obtained. After cooling the mixture to 35° C., 68 g sodium hydroxide solution (50%) was added and this mixture was cooled to 25° C. The excess of water was removed by spray-drying, the final product being fine powder of the following characteristics.

Free formaldehyde: 0.8%
Gel time @ 150° C.: 7.7 s
Softening point: 75° C.
Cure time @ 150° C.: 23 s
Moisture content: 6.6%
Retention on 200 mesh: 3%

The resin and ESSO 1728* wax were mixed with wood wafers (2.5% resin, 1.5% wax) and waferboards were pressed at 204° C. and 3375 kPa pressure for 4 minutes and 5 minutes. The boards obtained had the following characteristics when tested according to the CSA (Canadian Standards Association) specifications.

*Trademark

| Press cycle | 4 minutes | 5 minutes |
|---|---|---|
| M.O.R. | 3600 psi | 3800 psi |
| M.O.E. | 530000 psi | 530000 psi |
| Accel. Aging | 2000 psi | 2100 psi |
| I.B. | 62 psi | 65 psi |
| 24 Hour Soak Test | | |
| Linear Exp. | 0.20% | 0.24% |
| Moisture Abs. | 47% | 40% |
| Swelling | 18% | 15% |

EXAMPLE 2

1000 g black kraft liquor (50% solids, pH 13), 771 g phenol and 16 g potassium ferricyanide were mixed and maintained at 90° C. for 1 hour. Then the mixture was cooled down to 45° C., and 1086 g formaldehyde solution (50%), 984 g water and 95 g sodium hydroxide solution (50%) were added. The mixture was held at 65° C. for 75 minutes, then maintained at 80° C. until viscosity A-B was obtained. The liquid was then cooled down and subjected to spray-drying. The resulting resin had the following characteristics.

Free formaldehyde: 1.3%
Gel time @ 150° C.: 6.6 s
Softening point: 72° C.
Cure time @ 150° C.: 13 s
Moisture content: 6.4%
Retention on 200 mesh: 8%

When waferboards were made from this powder in the same way as in Example 1 they had the following properties.

| Press cycle | 4 minutes | 5 minutes |
|---|---|---|
| M.O.R | 3100 psi | 3000 psi |
| M.O.E. | 490000 psi | 580000 psi |
| Accel. Aging | 2000 psi | 2200 psi |
| I.B. | 49 psi | 62 psi |
| 24 Hour Soak Test | | |
| Linear Exp. | 0.20% | 0.18% |
| Moisture Abs. | 33% | 32% |
| Swelling | 14% | 13% |

EXAMPLE 3

1000 g black kraft liquor was mixed with 1274 g formaldehyde solution (50%) and held at 70° C. for 45 minutes. Then the mixture was cooled to 45° C., and 797 g phenol, 16 g potassium ferricyanide, 700 g water and 169 g sodium hydroxide solution (50%) were added. The mixture was maintained at 65° C. for 75 minutes and at 80° C. until viscosity C-D was obtained. After cooling the mixture to 35° C., 118 g sodium hydroxide solution (50%) was added, the mixture was cooled down and subjected to spray-drying. The resulting powder had the following characteristics.

Free formaldehyde: 1.5%
Gel time @ 150° C.: 6.2 s
Softening point: 75° C.
Cure time @ 150° C.: 21 s
Moisture content: 7.7%
Retention on 200 mesh: 4.5%

Waferboards made from this resin in the same way as in Example 1 had the following properties.

| Press cycle | 4 minutes | 5 minutes |
|---|---|---|
| M.O.R. | 3700 psi | 4100 psi |
| M.O.E. | 510000 psi | 590000 psi |
| Accel. Aging | 1900 psi | 1800 psi |
| I.B. | 55 psi | 58 psi | used. M.O.R., M.O.E., 1.B. and "accelerated aging" tests were carried out according to the techniques in the Canadian Standards Association tests for Waferboard, CAN3-0188.2-M78. Linear expansion, thickness swell and water absorption were determined by measuring dimensional and weight changes caused by soaking a board sample in water at room temperature for 24 hours.

TABLE 1A

| Exp. No. | F mole | BL weight | NaOH mole | CN % | REACTION CONDITIONS | | | | | |
|---|---|---|---|---|---|---|---|---|---|---|
| | | | | | 90° C. 1 hour | 70° C. 45 min | 65° C., 75 min | 80° C. C-D | 80° C. A-B | Post NaOH |
| 4 | 2.2 | 0.67 | 0.25 | 2 | | | BL, P, CN, F, NaOH, H₂O | X | | 0.1 |
| 5 | 2.2 | 0.67 | 0.14 | 2 | BL, P, CN | | F, H₂O, NaOH | | X | Nil |
| 6 | 2.5 | 0.67 | 0.42 | 2 | | BL, F | P, CN, NaOH, H₂O | X | | 0.17 |
| 7 | 3.0 | 0.83 | 0.14 | 2 | BL, P, CN | | F, H₂O, NaOH | | X | Nil |
| 8 | 2.2 | 0.67 | 0.25 | 1 | BL, P, CN | | F, H₂O, NaOH | X | | 0.1 |
| 9 | 2.2 | 0.67 | 0.25 | 2 | 0.5BL, P, CN | | 0.5BL, F, NaOH, H₂O | X | | 0.1 |
| 10 | 3.0 | 0.83 | 0.25 | 2 | | | BL, P, CN, F, NaOH, H₂O | X | | 0.03 |
| 11 | 2.2 | 0.67 | 0.25 | 1 | BL, P, CN | | F, H₂O, NaOH | X | | 0.1 |
| 12 | 2.2 | 0.67 | 0.42 | 2 | BL, P, CN | | F, NaOH, H₂O | X | | 0.17 |
| 13 | 2.2 | 0.67 | 0.42 | 5 | BL, P, CN | | F, NaOH, H₂O | X | | 0.17 |
| 14 | 2.2 | 0.67 | 0.42 | 2 | 0.5BL, P, CN | | 0.5BL, F, NaOH, H₂O | X | | 0.17 |
| 15 | 2.2 | 0.67 | 0.42 | 2 | 0.8BL, P, CN | | 0.2BL, F, NaOH, H₂O | X | | 0.17 |

TABLE 1B

| Exp. No. | F mole | BL weight | NaOH mole | CN % | 90° C. 1 hour | 65° C., 75 min | 55° C., 30 min | 70° C. 80 min | 80° C. D-E | 85° C. A-B | Post NaOH |
|---|---|---|---|---|---|---|---|---|---|---|---|
| 16 | 2.5 | 0.67 | 0.25 | 2 | BL, P, CN | | F, NaOH, H₂O | Yes | | X | Nil |
| 17 | 2.2 | 0.67 | 0.25 | 2 | | P, BL, F, CN, NaOH, H₂O | | | X | | 0.1 |
| 18 | 2.2 | 0.67 | 0.25 | 2 | BL, P, CN | F, NaOH, H₂O | | | X | | 0.1 |
| 19 | 2.2 | 0.67 | 0.25 | 2 | BL, P, CN | F, NaOH, H₂O | | | X | | 0.1 |
| 20 | 2.5 | 0.83 | 0.23 | 2 | BL, P, CN | | F, NaOH, H₂O | Yes | | X | Nil |
| 21 | 2.2 | 0.67 | 0.25 | 2 | | P, BL, F, CN, NaOH, H₂O | | | X | | 0.1 |
| 22 | 2.2 | 0.67 | 0.25 | 2 | BL, P, CN | F, NaOH, H₂O | | | X | | 0.1 |
| 23 | 2.2 | 0.67 | 0.25 | 2 | | P, BL, F, CN, NaOH, H₂O | | | X | | 0.1 |
| 24 | 2.2 | 0.67 | 0.25 | 2 | BL, P, CN | F, NaOH, H₂O | | | X | | 0.1 |
| 25 | 2.2 | 0.67 | 0.25 | 2 | | BL, P, CN, F, NaOH, H₂O | | | X | | 0.1 |

| | 24 Hour Soak Test | |
|---|---|---|
| Linear Exp. | 0.23% | 0.30% |
| Moisture Abs. | 46% | 46% |
| Swelling | 18% | 18% |

Examples 1 to 3 above show in detail resin preparation methods, and waferboard properties using these resins. In the following two tables further resins and their related boards are described in outline. Table 2 presents the same test parameters as the preceding examples. The following symbols are used in Table 1.
P: phenol
F: 50% formaldehyde
BL: black liquor
CN: potassium ferricyanide
Visc: viscosity
X: indicates held at specified temperature until specified viscosity reached.

Also in Table 1 the moles formaldehyde and catalyst are per mole phenol; the BL figure is a weight ratio per 1 part of phenol (i.e. a figure of 0.67 indicates 0.67 parts BL to 1 part P by weight); and the CN figure is percent by weight of the phenol. 'Post NaOH' indicates that an addition of sodium hydroxide was made at 35° C. after the reaction was completed; the figure given is moles NaOH added per mole phenol used in the preceeding reaction. These examples also involve the use of several different batches of black liquor. Particularly in Table 1B this is the main variable, as four different batches are used, one for each of the following groups: Experiment 16–19; 20–22; 23, 24; 25. In these tables, as in the preceeding examples, standard board test techniques were

TABLE 2A
PROPERTIES OF WAFERBOARDS MADE WITH THE RESINS OF TABLE 1A

| EXP. NO. | MOR psi | MOE psi | ACC. AG-ING psi | IB psi | LIN. EXP. % | WATER ABS. % | THICK. SWELL % |
|---|---|---|---|---|---|---|---|
| 4 | 3600 | 510000 | 2000 | 63 | 0.24 | 42 | 18 |
| 5 | 3400 | 540000 | 2100 | 53 | 0.20 | 34 | 15 |
| 6 | 3900 | 560000 | 2100 | 56 | 0.27 | 43 | 19 |
| 7 | 3000 | 480000 | 1900 | 59 | 0.23 | 38 | 19 |
| 8 | 3800 | 540000 | 2000 | 67 | 0.20 | 33 | 12 |
| 9 | 3400 | 520000 | 1900 | 48 | 0.24 | 35 | 17 |
| 10 | 3600 | 490000 | 1800 | 54 | 0.23 | 40 | 19 |
| 11 | 3400 | 500000 | 2200 | 58 | 0.23 | 37 | 15 |
| 12 | 4000 | 590000 | 1800 | 59 | 0.25 | 36 | 15 |
| 13 | 3100 | 490000 | 1700 | 50 | 0.27 | 40 | 15 |
| 14 | 3000 | 480000 | 1700 | 51 | 0.28 | 39 | 19 |
| 15 | 2500 | 520000 | 1900 | 47 | 0.26 | 37 | 17 |

TABLE 2B
PROPERTIES OF WAFER BOARD MADE WITH THE RESINS OF TABLE 1B

| EXP. NO. | MOR psi | MOE psi | ACC. AG-ING psi | IB psi | LIN. EXP. % | WATER ABS. % | THICK. SWELL % |
|---|---|---|---|---|---|---|---|
| 16 | 3400 | 500000 | 2000 | 56 | 0.31 | 47 | 20 |
| 17 | 3000 | 490000 | 2000 | 63 | 0.29 | 34 | 14 |
| 18 | 3800 | 610000 | 1550 | 40 | 0.06 | 40 | 21 |
| 19 | 3840 | 590000 | 1640 | 50 | 0.11 | 42 | 25 |
| 20 | 3500 | 500000 | 1950 | 60 | 0.25 | 54 | 27 |
| 21 | 3100 | 450000 | 1750 | 61 | 0.26 | 42 | 17 |

TABLE 2B-continued
PROPERTIES OF WAFER BOARD MADE WITH THE RESINS OF TABLE 1B

| EXP. NO. | MOR psi | MOE psi | ACC. AG- ING psi | IB psi | LIN. EXP. % | WA- TER ABS. % | THICK. SWELL % |
|---|---|---|---|---|---|---|---|
| 22 | 3750 | 550000 | 2000 | 63 | 0.10 | 41 | 20 |
| 23 | 3500 | 460000 | 1700 | 63 | 0.28 | 48 | 21 |
| 24 | 4100 | 590000 | 2200 | 58 | 0.17 | 41 | 19 |
| 25 | 3000 | 460000 | 1800 | 60 | 0.30 | 48 | 21 |

The embodiments of the invention in which an exclusive property or privilege is claimed are defined as follows:

1. A process for the preparation of a lignin-modified phenol-formaldehyde resin which comprises reacting together phenol, formaldehyde, lignosulfonate, potassium ferricyanide, and an alkali or alkaline earth basic catalyst in the following ratios:
   (a) phenol/formaldehyde: from 1:1.8 to 1:3.0, on a molar basis;
   (b) phenol/basic catalyst: from 1:0.1 to 1:0.5, on a molar basis;
   (c) phenol/potassium ferricyanide: from 100:1 to 10:1, on a weight basis; and
   (d) phenol/lignosulfonate: from 1:0.1 to 1:0.5 on a weight basis as lignosulfonate solids, or from 1:0.2 to 1:1.0 on a weight basis as lignosulfonate liquor containing approximately 50% by weight solids,
and continuing the reaction until a desired viscosity is reached, provided that the potassium ferricyanide is added either with or before the phenol.

2. A process according to claim 1 wherein the phenol/formaldehyde ratio is from 1:2.2 to 1:3.0.

3. A process according to claim 1 wherein the phenol/formaldehyde ratio is 1:2.2.

4. A process according to claim 1 wherein the phenol/lignosulfonate liquor ratio is from 1:0.6 to 1:0.85.

5. A process according to claim 1 wherein the lignosulfonate is in the form of recovered solids.

6. A process according to claim 1 wherein the lignosulfonate is in the form of black liquor.

7. A process according to claim 1 wherein the phenol/catalyst ratio is from 1:0.14 to 1:0.42.

8. A process according to claim 1 wherein the phenol/catalyst ratio is about 1:0.25.

9. A process according to claim 1 wherein the catalyst is sodium hydroxide.

10. A process according to claim 1 wherein the phenol/potassium ferricyanide ratio is from 100:1 to 20:1.

11. A process according to claim 1 wherein the phenol/potassium ferricyanide ratio is from 50:1 to 25:1.

12. A process according to claim 1 wherein the phenol/potassium ferricyanide ratio is about 50:1.

13. A process according to claim 1 wherein the lignosulfonate and formaldehyde are pre-reacted together, followed by the addition of the remaining reactants.

14. A process according to claim 1 wherein at least a portion of the phenol, potassium ferricyanide and at least a portion of the lignosulfonate are pre-reacted together, followed by the addition of the remaining reactants.

15. A process according to claim 1 wherein at least a portion of the phenol, potassium ferricyanide and the lignosulfonate are pre-reacted together, followed by the addition of the remaining reactants.

16. A process according to claim 1 including the additional steps of cooling the reaction mixture and adding thereto a post-addition of basic catalyst.

17. A process according to claim 1 including the additional steps of cooling the reaction mixture and adding thereto a post-addition of sodium hydroxide.

18. A process according to claim 1 wherein the phenol is technical grade phenol.

19. A process according to claim 18 wherein the technical grade phenol contains up to about 85% by weight of meta- and para-cresol.

20. A process according to claim 18 wherein the technical grade phenol has a boiling range of from 180° C. to 200° C., and contains not more than 15% by weight of ortho-cresol plus xylenols.

21. A process according to claim 1 including the further step of converting the resin to a solid by water removal.

22. A process according to claim 21 wherein the water is removed by spray drying.

23. A modified phenol-formaldehyde resin containing lignosulfonate, obtained by reacting together phenol, formaldehyde, lignosulfonate, potassium ferricyanide, and an alkali or alkaline earth basic catalyst in the following ratios:
   (a) phenol/formaldehyde: from 1:1.8 to 1:3.0, on a molar basis;
   (b) phenol/basic catalyst: from 1:0.1 to 1:0.5, on a molar basis;
   (c) phenol/potassium ferricyanide: from 100:1 to 10:1, on a weight basis; and
   (d) phenol/lignosulfonate: from 1:01 to 1:0.5 on a weight basis as lignosulfonate solids, or from 1:0.2 to 1:1.0 on a weight basis as lignosulfonate liquor containing approximately 50% by weight solids, and continuing the reaction until a desired viscosity is reached, provided that the potassium ferricyanide is added either with or before the phenol.

24. A resin according to claim 23 wherein the phenol/formaldehyde ratio is from 1:2.2 to 1:3.0.

25. A resin according to claim 23 wherein the phenol/formaldehyde ratio is 1:2.2.

26. A resin according to claim 23 wherein the phenol/lignosulfonate liquor is from 1:0.6 to 1:0.85.

27. A resin according to claim 23 wherein the lignosulfonate is black liquor.

28. A process according to claim 23 wherein the catalyst is sodium hydroxide.

29. A resin according to claim 23 wherein the phenol/potassium ferricyanide ratio is from 100:1 to 20:1.

30. A resin according to claim 28 wherein the phenol/potassium ferricyanide ratio is from 50:1 to 25:1.

31. A resin according to claim 28 wherein the phenol/potassium ferricyanide ratio is about 50:1.

32. A resin according to claim 23 wherein the phenol is technical grade phenol.

33. A resin according to claim 32 wherein the technical grade phenol contains up to about 85% by weight meta- and para-cresol.

34. A resin according to claim 32 wherein the technical grade phenol has a boiling range of from 180° C. to 200° C., and contains not more than 15% by weight of orthocresol plus xylenols.

35. A resin according to claim 23 which has been dehydrated by spray drying to provide a solid.

* * * * *